US010733756B2

United States Patent
Choi et al.

(10) Patent No.: US 10,733,756 B2
(45) Date of Patent: Aug. 4, 2020

(54) ONLINE FLOW GUIDED MEMORY NETWORKS FOR OBJECT DETECTION IN VIDEO

(71) Applicant: NEC Laboratories America, Inc., Princeton, NJ (US)

(72) Inventors: Wongun Choi, Lexington, MA (US); Samuel Schulter, Santa Clara, CA (US); Tuan Hung Vu, Santa Clara, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 113 days.

(21) Appl. No.: 16/115,620

(22) Filed: Aug. 29, 2018

(65) Prior Publication Data

US 2019/0139257 A1 May 9, 2019

Related U.S. Application Data

(60) Provisional application No. 62/585,575, filed on Nov. 14, 2017, provisional application No. 62/553,093, (Continued)

(51) Int. Cl.
*G06K 9/00* (2006.01)
*G06T 7/73* (2017.01)
(Continued)

(52) U.S. Cl.
CPC ............ *G06T 7/73* (2017.01); *G06K 9/00744* (2013.01); *G06K 9/00979* (2013.01); (Continued)

(58) Field of Classification Search
CPC .. G06T 7/73; G06T 7/269; G06T 7/20; G06T 2207/10016; G06T 2207/20016; (Continued)

(56) References Cited

U.S. PATENT DOCUMENTS 10,445,402 B1 * 10/2019 Wang ..................... G06N 3/02
2019/0138814 A1 * 5/2019 Schulter .................. G06T 7/73
(Continued)

OTHER PUBLICATIONS

Zhu, "Flow-Guided Feature Aggregation for Video Object Detection", ICCV 2017, Mar. 2017, pp. 408-417.
(Continued)

*Primary Examiner* — Jonathan S Lee
(74) *Attorney, Agent, or Firm* — Joseph Kolodka

(57) ABSTRACT

A computer-implemented method, system, and computer program product are provided for object detection utilizing an online flow guided memory network. The method includes receiving, by a processor, a plurality of videos, each of the plurality of videos including a plurality of frames. The method also includes generating, by the processor with a feature extraction network, a frame feature map for a current frame of the plurality of frames. The method additionally includes determining, by the processor, a memory feature map from the frame feature map and a previous memory feature map from a previous frame by warping the previous memory feature map. The method further includes predicting, by the processor with a task network, an object from the memory feature map. The method also includes controlling an operation of a processor-based machine to react in accordance with the object.

18 Claims, 8 Drawing Sheets

Related U.S. Application Data filed on Aug. 31, 2017, provisional application No. 62/553,092, filed on Aug. 31, 2017.

(51) Int. Cl.
*G06T 7/269* (2017.01)
*G06K 9/62* (2006.01)
*G06T 7/20* (2017.01)

(52) U.S. Cl.
CPC ........... *G06K 9/629* (2013.01); *G06K 9/6232* (2013.01); *G06T 7/20* (2013.01); *G06T 7/269* (2017.01); *G06T 2207/10016* (2013.01); *G06T 2207/20016* (2013.01); *G06T 2207/20076* (2013.01); *G06T 2207/20081* (2013.01); *G06T 2207/20084* (2013.01)

(58) Field of Classification Search
CPC . G06T 2207/20076; G06T 2207/20081; G06T 2207/20084; G06K 9/00744; G06K 9/00979; G06K 9/6232; G06K 9/629
USPC ........................................................ 382/103
See application file for complete search history.

(56) References Cited

U.S. PATENT DOCUMENTS

| 2019/0156157 A1* | 5/2019 | Saito | G06K 9/00275 |
| 2019/0244028 A1* | 8/2019 | Jones | G06K 9/00624 |
| 2019/0287216 A1* | 9/2019 | Liu | G06T 3/4061 |
| 2020/0034627 A1* | 1/2020 | Zhu | G06N 3/04 |

OTHER PUBLICATIONS

Dai, "R-FCN: Object Detection via Region-Based Fully Convolutional Networks", NIPS 2016, Jul. 2016, pp. 1-9.

\* cited by examiner

700

Receive a plurality of videos, each of the plurality of videos including a plurality of frames.
710

Generate, with a feature extraction network, a frame feature map for a current frame of the plurality of frames.
720

Determine a memory feature map from the frame feature map and a previous memory feature map from a previous frame by warping the previous memory feature map.
730

*Generate displacement vectors from the current frame and the previous frame.*
735

*Aggregate the frame feature map with a warped memory feature map.*
737

Predict, with a task network, an object from the memory feature map.
740

Control an operation of a processor-based machine to react in accordance with the object.
750

Receive a plurality of videos, each of the plurality of videos including a plurality of frames.
810

Generate, with a feature extraction network, a frame feature map for a current frame of the plurality of frames.
820

Aggregate a memory feature map from the frame feature map and previous memory feature maps from previous frames on a plurality of time axes, with the plurality of time axes including a first time axis at a first frame increment and a second time axis at a second frame increment with the second frame increment greater than the first frame increment.
830

Predict, with a task network, an object from the memory feature map.
840

Control an operation of a processor-based machine to react in accordance with the object.
850

FIG. 8

ONLINE FLOW GUIDED MEMORY NETWORKS FOR OBJECT DETECTION IN VIDEO

RELATED APPLICATION INFORMATION

This application claims priority to 62/553,092, filed on Aug. 31, 2017, 62/553,093, filed on Aug. 31, 2017, and 62/585,575, filed on Nov. 14, 2017, incorporated herein by reference in its entirety. This application is related to an application entitled "Temporal Multi-State Clockwork Memory Networks for Object Detection in Videos", having Ser. No. 16/115,630, and which is incorporated by reference herein in its entirety.

BACKGROUND

Technical Field

The present invention relates to object detection and more particularly online object detection in video.

Description of the Related Art

A per-frame-detector at every time frame can be applied independently to detect an object in video. The method is very simple to implement. However, the approach often becomes unstable when there is an occlusion or motion blur in the video. A Flow Guided Feature Aggregation (FGFA) model which aggregates features across the past and future frames in combination with optical flow estimation networks can detect an object in video. However, often one is not applicable in online scenarios due to batch feature aggregation and it is also due to their expensive.

SUMMARY

According to an aspect of the present principles, a computer-implemented object detection method is provided utilizing an online flow guided memory network. The method includes receiving, by a processor, a plurality of videos, each of the plurality of videos including a plurality of frames. The method also includes generating, by the processor with a feature extraction network, a frame feature map for a current frame of the plurality of frames. The method additionally includes determining, by the processor, a memory feature map from the frame feature map and a previous memory feature map from a previous frame by warping the previous memory feature map. The method further includes predicting, by the processor with a task network, an object from the memory feature map. The method also includes controlling an operation of a processor-based machine to react in accordance with the object.

According to another aspect of the present principles, a computer program product is provided for object detection utilizing an online flow guided memory network. The computer program product comprising a non-transitory computer readable storage medium having program instructions. The program instructions executable by a computer to cause the computer to perform a method. The method includes receiving, by a processor, a plurality of videos, each of the plurality of videos including a plurality of frames. The method also includes generating, by the processor with a feature extraction network, a frame feature map for a current frame of the plurality of frames. The method additionally includes determining, by the processor, a memory feature map from the frame feature map and a previous memory feature map from a previous frame by warping the previous memory feature map. The method further includes predicting, by the processor with a task network, an object from the memory feature map. The method also includes controlling an operation of a processor-based machine to react in accordance with the object.

According to another aspect of the present principles, object detector to detect objects in video is provided. The object detector includes a processing system having a processor device and memory coupled to the processor device. The processing system having program code configured to receive a plurality of videos, each of the plurality of videos including a plurality of frames. The processing system having program code also configured to generate, with a feature extraction network, a frame feature map for a current frame of the plurality of frames. The processing system having program code additionally configured to determine a memory feature map from the frame feature map and a previous memory feature map from a previous frame by warping the previous memory feature map. The processing system having program code further configured to predict, with a task network, an object from the memory feature map. The processing system having program code also configured to control an operation of a processor-based machine to react in accordance with the object.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block diagram illustrating a method for object detection utilizing an online flow guided memory network, in accordance with an embodiment of the present invention; and FIG. 8 is a block diagram illustrating a method for object detection utilizing a clockwork flow guided memory network, in accordance with an embodiment of the present invention.

DETAILED DESCRIPTION OF PREFERRED EMBODIMENTS

In accordance with the present principles, systems and methods are provided for online object detection in video. A memory-based online video representation that is efficient, accurate and predictive is provided. This is in contrast to prior works that often rely on computationally heavy 3D convolutions, ignore actual motion when aligning features over time, or operate in an off-line mode to utilize future frames. In particular, aspects of the present invention (i) hold the feature representation, (ii) are spatially warped over time to compensate for observer and scene motions, (iii) can carry long-term information, and (iv) enable predicting feature representations in future frames. By exploring a variant that operates at multiple temporal scales, learning is achieved across even longer time horizons. The online framework can be applied to object detection in videos to obtain a speed improvement of about 130% with only 0.9% mean average precision (mAP) loss. The online framework can propagate features over time to (i) significantly enhance a real-time detector by more than 10% mAP in a multi-threaded online setup and to (ii) anticipate objects in future frames.

Motion is an intermediary for human visual perception to learn about its environment and relate to it. By encapsulating motion cues, video represents a rich medium for computer vision to understand and analyze the visual world. While the advent of convolutional neural networks (CNNs) has led to rapid improvements in learning spatial features, a persistent challenge remains to learn efficient representations that derive significant benefits from long-term temporal information in videos.

Online video representations are learned that incorporate multi-scale information on longer time horizons and design practical frameworks that achieve accuracy, efficiency and predictive power. The temporal coherence allows learning powerful representations while achieving greater invariance to blur, lighting, pose and occlusions by accounting for motion across frames. While the frameworks are applicable to diverse problems, the frameworks are particularly useful with object detection in videos. The framework can utilize a video representation that composes information across time in an online fashion, which is not only faster, but also enables predictive applications.

Figure 1:
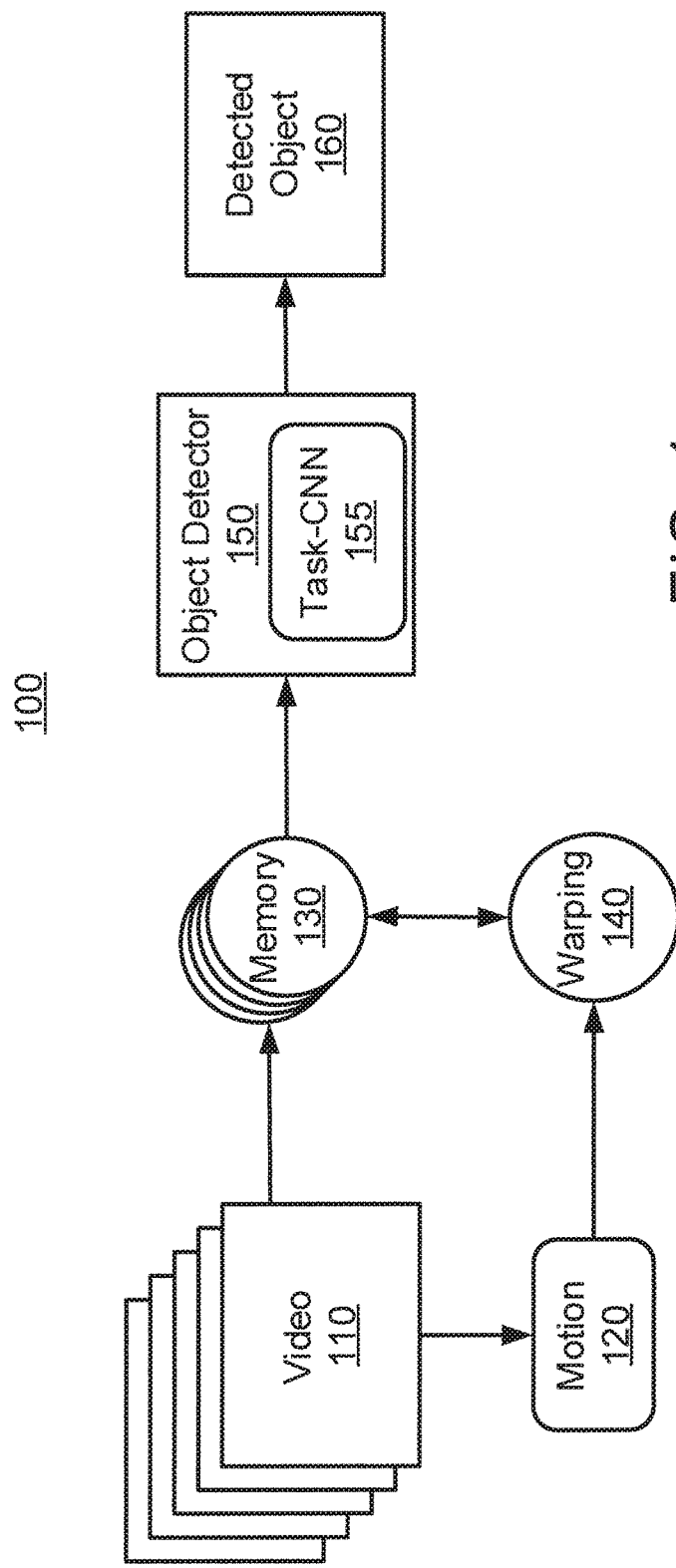
FIG. 1 is a block/flow diagram illustrating a high-level method for online object detection, in accordance with the present principles.

Referring now in detail to the figures in which like numerals represent the same or similar elements and initially to FIG. 1, a block/flow diagram of a high-level method 100 for online object detection is illustratively depicted in accordance with one embodiment of the present principles. The method 100 can have a video 110. The video 110 can be fed into a multi-scale memory 130 and a motion detection system 120 as the video 110, frames of the video 110, or segments of the video 110. The motion detection system 120 can pass detected motions from the video 110 into a feature warping system 140.

The feature warping system 140 can pass information bi-directionally with the multi-scale memory 130. The feature warping system 140 enables learning of better representations of the video 110 that can lead to higher accuracy. The multi-scale memory 130 can aggregate video evidence from the video 110 and the feature warping system 140 to feed into an object detector 150. The object detector 150 can include a task convolutional neural network (task-CNN) 155. The task-CNN 155 can process the aggregated video evidence from the multi-scale memory 130 to accurately detect objects. The object detector 150 can output detected objects 160.

An online flow guided memory network (OFGMN), a network structure, can hold a memory of the feature representation in the multi-scale memory 130, which is updated at every frame based on image observations solely from the past and warped from one frame to the next to account for observer and scene motions with the feature warping system 140. OFGMN employs a displacement field in the feature warping system 140 for warping by encoding memory that allows retention of information from further in the past, while utilizing only a single warp computation per-frame. This can be, e.g., 2.3 times faster than other methods, which can employ as many warps as the number of temporally aggregated frames. A clockwork flow guided memory network (CFGMN), a hierarchical network structure, can extend OFGMN by operating at multiple temporal scales. This allows efficiently leveraging information from even longer temporal horizons, which improves the representation power. In one example, OFGMN and CFGMN improved up to 2.2% in mAP over per-frame baselines. Higher improvements are contemplated.

A benefit of the online nature of the video representation is that aspects of the present invention impart predictive abilities, which enable novel applications. First, the accuracy of an online real-time detector 150 is enhanced, by leveraging a stronger but less efficient detector in another thread. While the strong detector can lag due to higher latency, the memory warping enables propagating and aligning representations with the real-time detector 150, boosting the accuracy of the real-time detector 150 by more than 10% mAP, with no impact on speed or online operation. This combination is unique, since parallelizing standard detectors in an online setup is not straightforward. Next, the predictive warping of video representations with the warping feature system 140 enables anticipating features in future frames, which permits solving visual tasks without actually observing future images. Finally, the contributions are architecture-independent. The speed, accuracy and predictive benefits of aspects of the present invention are available for any detection method on video inputs.

In one embodiment, the feature representation for objects can be improved in videos, by leveraging temporal information and motion. Exploiting past frames can also help predictions in the current frame when occlusions or motion blur distorts image evidence. Continuously aggregating and updating features over time to provide a stable and powerful representation of the scene captured by the video is provided.

Figure 2:
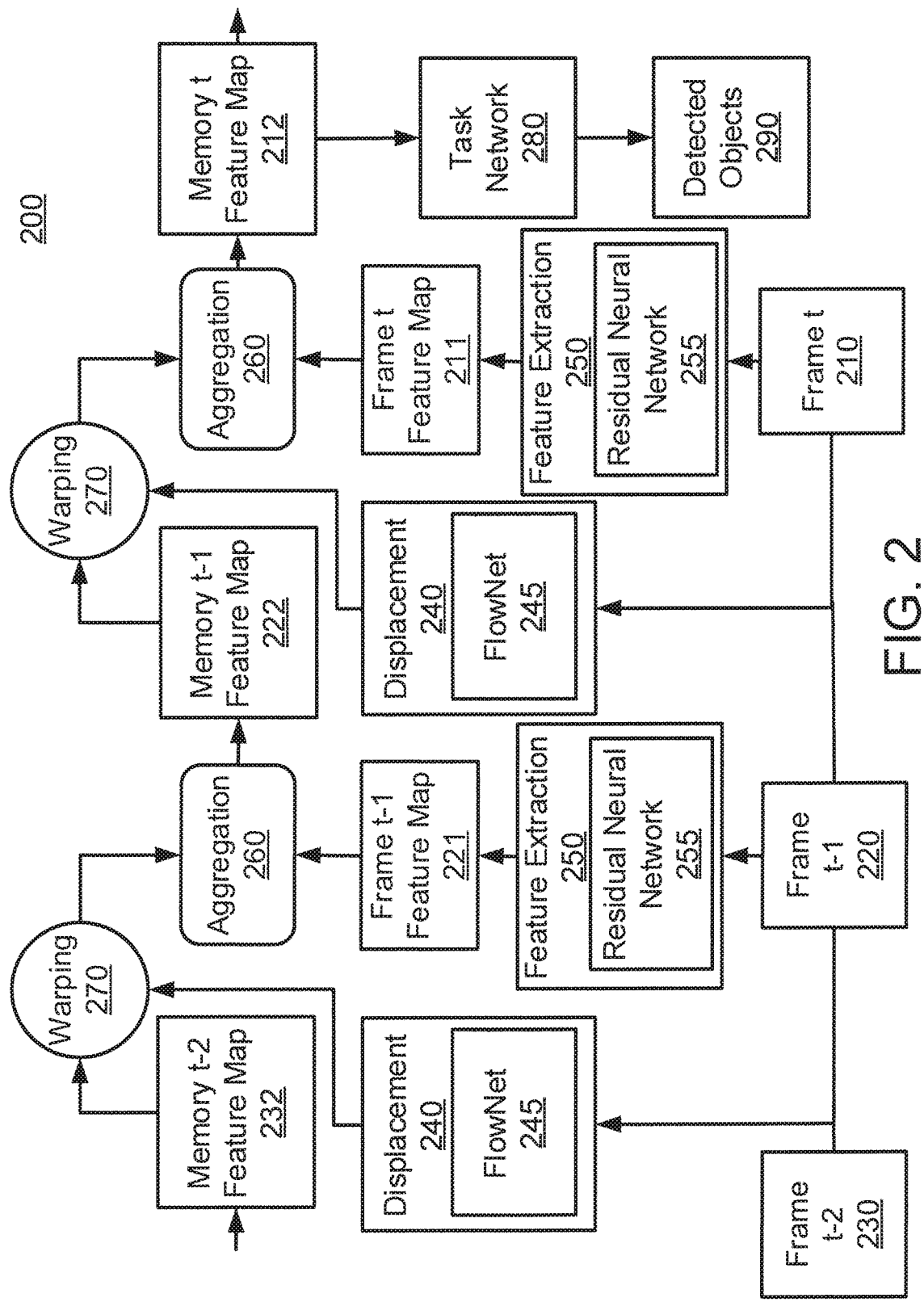
FIG. 2 is a block/flow diagram illustrating an online flow guided memory network, in accordance with the present principles.

Referring now to FIG. 2, a block/flow diagram for an OFGMN 200 is illustratively depicted in accordance with an embodiment of the present principles. The OFGMN 200 can take a video input and decompose the video into frames. The frames can include a current frame t 210. The frame before the frame t 210 can be frame t−1 220. The frame before the frame t−1 220 can be frame t−2 230. Each of the frames can be fed into a feature extraction network 250. The feature extraction network 250 can extract features from the frame to generate frame feature maps utilizing a residual neural network (ResNet) 255. The feature extraction network 250 can generate a frame t feature map 211 from the frame t 210. The feature extraction network 250 can generate a frame t−1 feature map 221 from the frame t−1 220.

Frame feature maps can be fed into an aggregation system 260. The aggregation system 260 can aggregate frame feature maps with warped memory maps from the previous frame. The aggregation system 260 can utilize many different methods for this aggregation of feature maps, including e.g., simple averaging, a learned adaptive weighting, etc. The aggregation system 260 can generate a memory t feature map 212 from the frame t feature map 211 and a warped version of a memory t−1 feature map 222. The aggregation system 260 can generate the memory t−1 feature map 222 from the frame t−1 feature map 221 and a warped version of a memory t−2 feature map 232.

The warped version of a memory feature map can be generated by warping 270, using for example, bilinear sampling, a previous frame memory map with output displacement vectors from a displacement network 240. The displacement network can utilize the current frame and the previous frame to generate the output displacement vectors. The displacement network 240 can utilize an optical flow convolutional neural network (FlowNet) 245 to measure the motion of all visual elements in the scene. In one embodiment, the frame t 210 and the frame t−1 220 can be fed into the displacement network 240 to generate displacement vectors. The displacement vectors from the displacement network 240 along with the memory t−1 feature map 222 can be fed into a warping 270 to generate the warped version of the memory t−1 feature map 222. The warped version of the memory t−1 feature map 222 can be fed into the aggregation system 260 along with the frame t feature map 211 to generate the memory t feature map 212. The memory t feature map 212 can be fed into a task network 280 that outputs final object detections 290 found in frame 210.

In another embodiment, given a single image $I \in \mathbb{R}^{h_I \times \omega_I \times 3}$, a convolutional neural network (CNN) with parameters $\Theta_F$ first extracts a feature map $F \in \mathbb{R}^{h_F \times \omega_F \times d_F}$, where $d_F$ is the number of feature maps and can have $$h_F = \frac{1}{16} h_I \text{ and } \omega_F = \frac{1}{16} \omega_I.$$

I is a three-dimensional tensor representing the single image in space $\mathbb{R}$. $h_I$ is the height for the image, $\omega_I$ is the width for the image, and the third dimension is the number of colors in the image. In this example, the third dimension is fixed at 3 as the image has 3 color channels: Red, Green, and Blue. In another example, the third dimension can include more than three dimensions to represent other color models. F is a three-dimensional tensor that represents the feature map in a space $\mathbb{R}$. The first two dimensions, like the image tensor, are height, $h_F$, and width, $\omega_F$. The third dimension is the feature dimension with a variable length represented by $d_F$. $\Theta_F$ are the parameters trained into the CNN that compute features (F) from the single image. The single image feature representations are effectively aggregated over time. While a single feature map per image is employed for ease of presentation, note that multiple feature maps at different resolutions to handle scale variations can be handled.

In every frame t, a feature map $M_t \in \mathbb{R}^{h_F \times \omega_F \times d_F}$ acts as a memory on the feature representation of the video. $M_t$ is a three-dimensional tensor representing the feature map of frame t in a space $\mathbb{R}$. The first two dimensions, like the image tensor, are height, $h_F$, and width, $\omega_F$. The third dimension is the feature dimension with a variable length represented by $d_F$ to represent the number of feature maps. Since the scene is dynamic and the camera is moving, the same objects will appear at different locations of the image plane in frames t−1 and t. In order for the memory of the past frame $M_{t-1}$ to benefit detection in the current frame t, $M_{t-1}$ needs to be transformed according to the scene dynamics. A bilinear sampling can be employed to implement this transformation, $$\hat{M}_t \phi(M_{t-1}; D_{(t,t-1)}) \quad (1)$$

where $\phi(\cdot)$ is the bilinear sampling function with arguments $M_{t-1}$ and $D_{(t,t-1)}$. $D_{(t,t-1)} \in \mathbb{R}^{h_F \times \omega_F \times 2}$ is a displacement (or flow) field between frames t and t−1, which is estimated by a CNN with parameters $\Theta_D$. $D_{(t,t-1)}$ is a three-dimensional tensor representing the displacement field in space $\mathbb{R}$. $h_F$ is the height for the frame, $\omega_F$ is the width for the frame, and the third dimension is the frames. The third dimension is fixed at 2 as the displacement field is between 2 frames, t and t−1. $\Theta_D$ are the parameters trained into the CNN that computes the displacement ($D_{(t,t-1)}$) for each pixel between frames t and t−1, e.g., where does each pixel of the first frame end up in the second frame? This CNN is a pre-trained FlowNet 245, which takes images $I_t$ and $I_{t-1}$ as input and predicts the displacement with the parameters $\Theta_D$ fine-tuned for the task at hand. Note that for fast computation of the displacement field, the FlowNet 245 can be fed with half-resolution images and up-scale the displacement field. Also note that in the absence of ground truth data for the displacement field, this CNN predicts displacements suitable for the task at hand.

After having transformed the memory to the current frame t, i.e., $\hat{M}_t$, the newly available image evidence $F_t$ extracted by the feature CNN can be aggregated into the memory, $$M_t = \psi(\hat{M}_t, F_t) \quad (2)$$

which can define one step of the OFGMN. Two variants of the aggregation function $\omega(\cdot)$ can be implemented. The first is a parameter-free combination that leads to exponential decay of memory over time, $$\psi(\hat{M}, F) := \frac{1}{2}(\hat{M} + F) \quad (3)$$

and the second is a weighted combination of memory and image features, $$\psi(\hat{M}, F) := \alpha^M \cdot \hat{M} + \alpha^F \cdot F \quad (4)$$

with $\alpha^M, \alpha^F \in \mathbb{R}^{h_F \times \omega_F \times 1}$ and $\alpha^M + \alpha^F = 1$. $\alpha^M, \alpha^F$ are three-dimensional tensor representing the displacement field in space $\mathbb{R}$. $h_F$ is the height for the image, $\omega_F$ is the width for the image, and the third dimension is fixed at 1, which makes the tensors like a two-dimensional matrix, where each value describes the importance for features (F) and memory (M). The weights are computed by a small CNN with parameters $\psi_M$ and $\psi_F$ operating on M and F, respectively, and the constraint $\alpha^M + \alpha^F = 1$ is always satisfied by sending the concatenated output of the CNNs through a per-pixel softmax function. $\psi_M$ and $\psi_F$ are the parameters of the CNN that compute the importance of the memory (M) and the features (F) from the current image for the aggregation function. The parameters of the weight-CNNs are automatically learned together with the rest of the network without any additional supervision. In the first frame t=1, the memory $M_1$ can be assigned to be the feature representation of the image $F_1$.

Training the video representation employs a supervisory signal from a task module that is put on top of the memory features M. In general, the task module can be anything, even an unsupervised task like predicting future frames. Object detection in videos can be explored where the supervisory signal comes from a combination of object localization and classification loss functions.

All parts of the video representation can be trained end-to-end. Since bilinear sampling and the grid generation of the warping module are both differentiable, gradients can be back-propagated over time to previous frames, to the image feature extractor, as well as to the FlowNet 245 generating the displacement fields.

While the network architecture allows gradients to flow over the memory warping module to learn a good feature propagation, the architecture also opens a shortcut for minimizing the loss because image evidence is available at every frame. While for some tasks past information is truly essential for prediction in the present, for several tasks the image of the current frame already provides most evidence for a good prediction (or at least a signal to minimize the loss). To encourage the network to learn a good feature propagation module, image evidence, e.g., with probability 0.8, can be randomly dropped at frame t, which can improve results by at least a few percentage points.

OFGMN operates on just a single temporal scale, which has limited capability to leverage information at a larger temporal horizon. While information from the whole video sequence is included in the feature representation of the current frame t, this portion can be vanishingly small, particularly for the aggregation function relying on the exponential decay.

In another embodiment, a clock-work structure, e.g., CFGMN, is provided that operates on multiple temporal scales. Instead of having a single memory feature map, CFGMN has K memories $M_t^k$ at frame t with $k \in \{1, \ldots, K\}$, each of them operating at different rates. CFGMN updates memory $M^k$ every $2^{k-1}$ frames with new image evidence, although other schedules are also possible. Note that when K=1, OFGMN is obtained.

In order to exchange information across the different time scales k, CFGMN can aggregate all memory maps at a single frame t by simply averaging them, i.e., $$M_t = \frac{1}{K} \sum_{k=1}^{K} M_t^k.$$

As with the feature map aggregation in OFGMN, different strategies for combining feature maps are possible. The simpler parameter-free averaging can be employed, though a more complex learning-based weighting scheme can also be employed. The aggregated memory $M_t$ can then be used as input to any task-specific modules. Processing two or more frames to leverage objects in the previous frames to reduce processing time and utilized resources.

Figure 3:
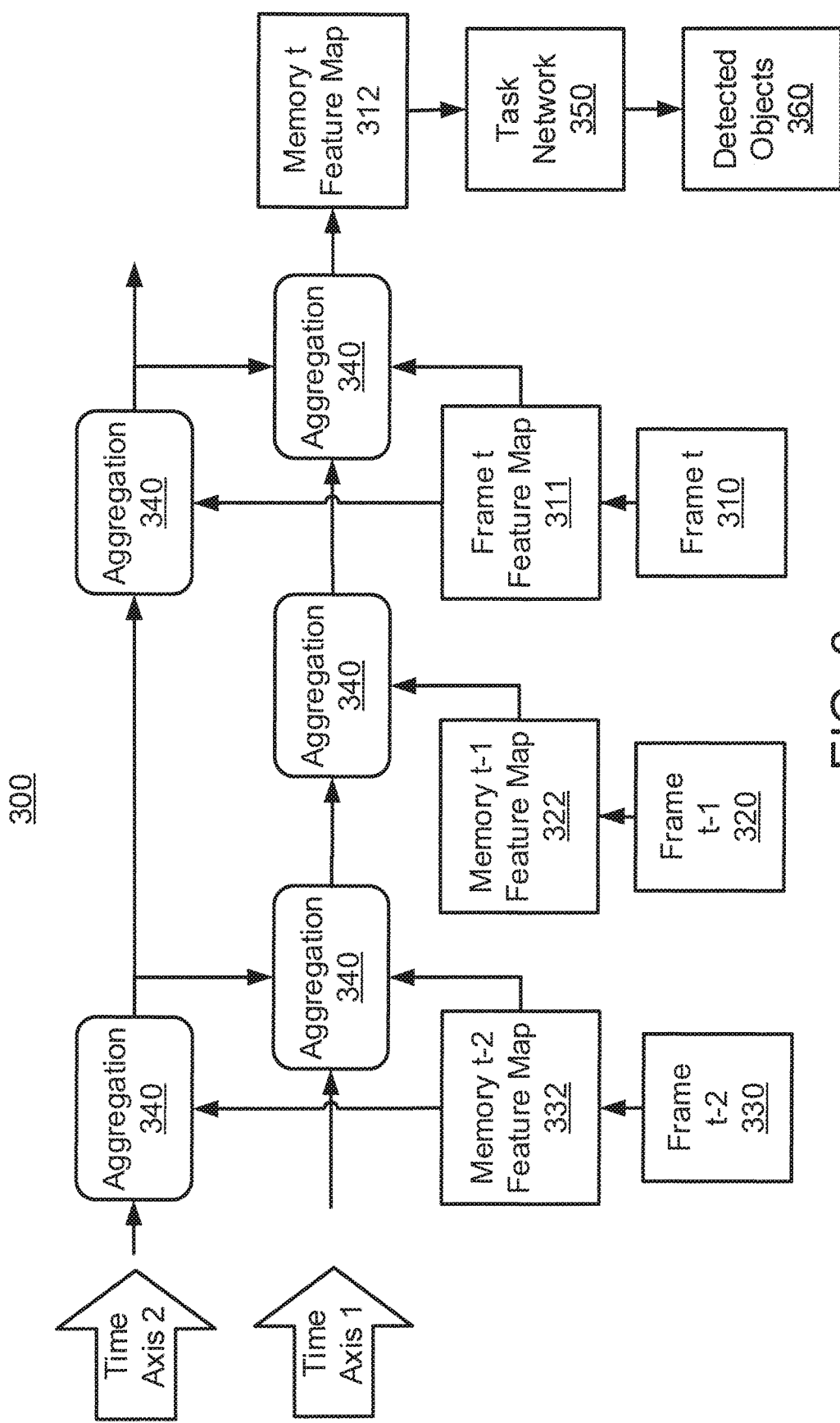
FIG. 3 is a block/flow diagram illustrating a clockwork flow guided memory network, in accordance with the present principles.

Referring now to FIG. 3, a block/flow diagram for clockwork flow guided memory network (CFGMN) 300 is illustratively depicted in accordance with an embodiment of the present principles. The CFGMN 300 can have multiple time axes, for example, e.g., time axis 1 and time axis 2. The CFGMN 300 can include multiple frames, e.g., frame t 310, frame t−1 320, and frame t−2 330. Each of the frames can be utilized in one or more of the time axis. In one embodiment, the frame t−2 330 and frame t 310 can be utilized in time axis 2, while the frame t−2 330, the frame t−1 320, and frame t 310 can be utilized in time axis 1.

A current frame from a video can be processed in the CFGMN to detect objects in the current frame. The current frame can be processed into a frame feature map that can be aggregated with memory feature maps from previous frames on different time axis to form a memory feature map for the current frame. The memory feature map can be fed into a task network to detect objects in the frame. In one embodiment, a frame t 310 can be processed into a frame t feature map 311. The frame t feature map 311 can be fed into an aggregation system 340 in both time axis 1 and time axis 2. The aggregation system 340 in time axis 1 can output a memory t feature map 312. The memory t feature map 312 can be fed into a task network 350 to detect objects 360. The frame t−1 320 and the frame t−2 330 can be processed to form a memory t−1 feature map 322 and a memory t−2 feature map 332. These memory feature maps can be fed into the aggregation systems 340 in the time axis 1 and the time axis 2 to be utilized when generating the memory t feature map 312. This embodiment utilizes 2 time axes, but more time axes can be utilized. In another embodiment, a CFGMN can utilize k time axes, with each additional time axis k>1 skipping $2^{k-1}-1$ frames. In yet another embodiment, a CFGMN can utilize k time axis, with each additional time axis k>1 skipping $x^{k-1}-1$ frames, with x being a predefined variable.

The memory-based online video representation has a simple and intuitive structure, can be trained end-to-end and can fulfill the basic requirements for a fast and causal system that can be applied to videos in any real-world application. The OFGMN does not look at future frames and is also not limited to a specific temporal horizon in the past, rather can carry information from the whole (past) sequence in its memory. An even longer temporal horizon is utilized in the CFGMN.

Figure 4:
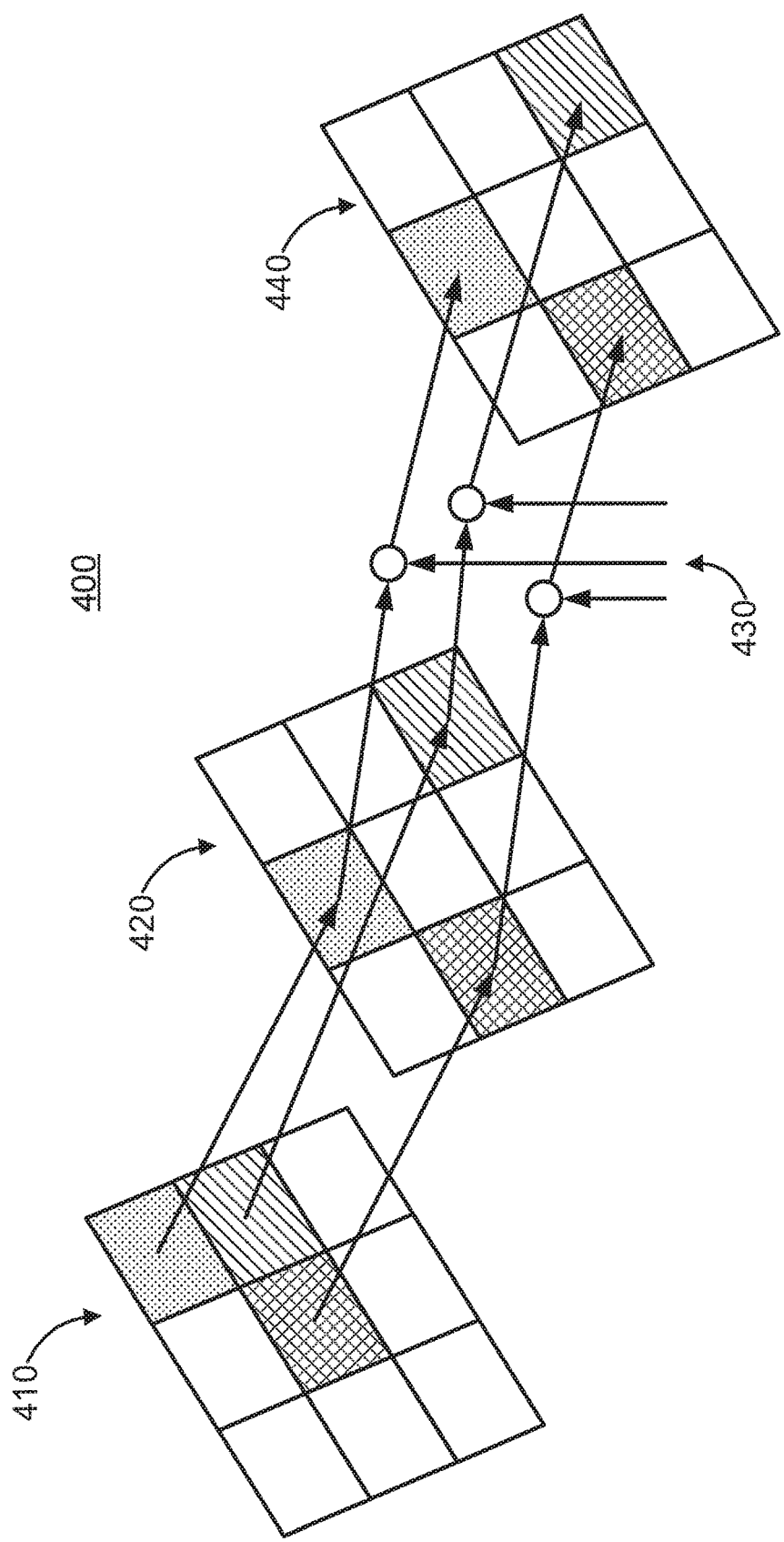
FIG. 4 is a diagram illustrating a frame being processed through a memory-based online video representation, in accordance with the present principles.

There also exists a relation to convolutional recurrent neural networks (cRNN), however, with one notable difference. While cRNNs keep their hidden memory fixed across spatial dimensions ($h_t = RNN(h_{t-1}, x_t)$), aspects of the present invention enables the memory to be spatially aligned with an observer and scene motion in the actual video content ($h_t = RNN(warp(h_{t-1}, D_{t,t-1}), x_t)$), as seen in FIG. 4. The aggregation function $\psi(\cdot)$ for a new input and a previous hidden state can be simple.

Referring now to FIG. 4, a diagram of a frame being processed through a memory-based online video representation 400 is illustratively depicted in accordance with an embodiment of the present principles. The frame being processed through a memory-based online video representation 400 can include a previous frame 410. In one embodiment, the previous frame 410 can be represented by $h_{t-1}$. The previous frame 410 can be divided into sections for processing. The sections can include objects in the frame. The previous frame 410 can then be warped for spatial alignment into a warped frame 420. In one embodiment, the warped frame 420 can be represented by warp($h_{t-1}$). In another embodiment, the warped frame 420 can be focused on an observer and scene motion in the previous frame 410. The warped frame 420 can be aggregated with evidence from a current frame 430 to form a frame map for the current frame 440. In yet another embodiment, the spatially aligned can be represented by $x_t$. In an additional embodiment, the frame map for the current frame 440 can be represented by $h_t$.

While the memory features M can be utilized for any downstream task, the memory-based online video representation focus is on object detection in videos. Modern object detectors can have a similar high-level structure in the sense that they all rely on a convolutional neural network to extract features F from a single image. The detection-specific modules applied on top of F define the differences between the detectors making F an interface between one generic module and detection-specific modules. The OFGMN and the CFGMN operate on F and compute a novel feature representation M, making the memory-based online video representation better than all of these detectors.

In one embodiment, a representation $M_t$ of a video sequence at frame t is provided, the object detector first computes object proposals with a region proposal network (RPN). Object proposals define potential locations of objects of interest (independent of the actual category) and reduce the search space for the final classification stage. Each proposal is then classified into one of C categories and the corresponding proposal location is further refined. The per-proposal computation costs in R-FCN are minimal by using position-sensitive ROI pooling. This special type of ROI pooling is applied on the output of the region classification network (RCN).

In another embodiment, an input stream captures images at 20 frames-per-second (FPS), an object detector is desired that can process one image in less than 50 milliseconds (ms) to avoid latency in the output. One easy option to speed-up the object detector is to use a more light-weight feature extraction CNN. Note that this is a viable option for any detection framework. However, accuracy will decrease. Here, another option is explored to speed-up the object detector. Instead of using a single model, two models with complementary properties can be exploited running simultaneously (but asynchronously) on two threads (two GPUs) to achieve both speed and accuracy, using feature propagation. It is important to note that achieving a speed-up with two GPUs is complicated in a real-time setting. It can be easy to distribute computation of different images on multiple GPUs in offline cases, but this is not a simple option for streaming data.

Figure 5:
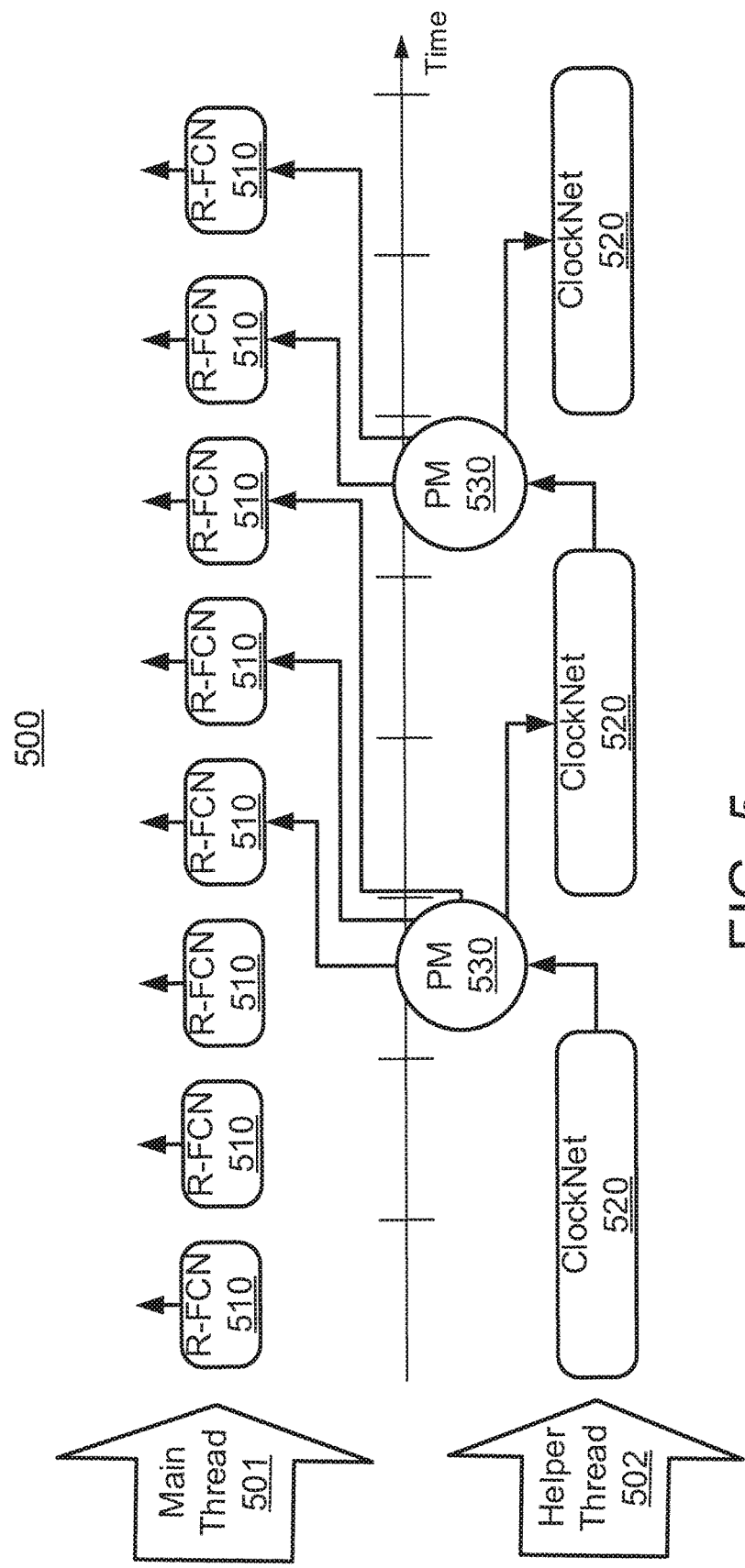
FIG. 5 is a block/flow diagram illustrating a multi-threaded object detector, in accordance with of the present principles.

Referring now to FIG. 5, a block/flow diagram of a multi-threaded object detector 500 is illustratively depicted in accordance with an embodiment of the present principles. The multi-threaded object detector 500 can have a main thread 501 and a helper thread 502. A fast detector, R-FCN 510 (e.g., R-FCN with ResNet) in the main thread 501 and a slower but also stronger detector, CFGMN 520, in the helper thread 502. The main thread 501 can run a R-FCN 510 during each clock cycle over a period of time to provide output for every frame, however at a lower quality than CFGMN 520 could provide if no time requirements existed. The R-FCN 510 can be a fast but weak object detector. The helper thread 502 can run CFGMN 520 over the same period of time. The main issue with the strong object detector is that it will always have some delay (or latency) Δ to produce an output. If Δ is too large for a practical system, the strong detector is not usable.

The CFGMN 520 can take longer than a clock cycle to process, so it can be run fewer times than the RFCN 510 in the main thread 501. The CFGMN 520 can be a slow but strong object detector. The output from the CFGMN 520 can only be available after the CFGMN 520 is run. The output for frame t can be efficiently warped into frame t with a propagation module 530. The output from the propagation module 530 can be fed into the R-FCN 510 and the CFGMN 520 for frames after the propagation module 530. The warped features from the propagation module 530 boost the representational power of R-FCN 510 significantly, without increasing latency of the real-time system. This design can still leverage the strong features by making up for the delay via the feature propagation module 530. The displacement field is computed between frame t+Δ and t and warp the strong features $M_t^{CNet}$ from the CFGMN 520 on the helper thread 502 for frame t, into the current frame t+Δ, where the fast object detector has already computed features $F_{t+\Delta}^{RFCN}$, from the R-FCN 510 on the main thread 501 for frame t+Δ. The representational power of the R-FCN 510 is boosted by combining the feature maps. Again, the average of both features (the dimensionality is the same) are taken, but more advanced aggregation schemes are possible.

In another embodiment, the feature propagation can be future prediction or anticipation. Features from the current frame t are propagated to a future frame t+Δ, where the task network is applied to make predictions. The feature propagation over several frames is realized, but the displacement fields are still computed from image evidence. For a true visual anticipation, however, future images are not available.

The displacement fields can be extrapolated into future frames and used to propagate the feature (or memory) maps. Given two displacement fields $D_{t-1,t-2}$ and $D_{t,t-1}$, the difference of aligned displacement vectors is computed (with bilinear sampling), which gives the acceleration of pixels. A simple constant acceleration motion model can be employed to each displacement vector and extrapolate for one or multiple frames. This extrapolation technique demonstrates feature anticipation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
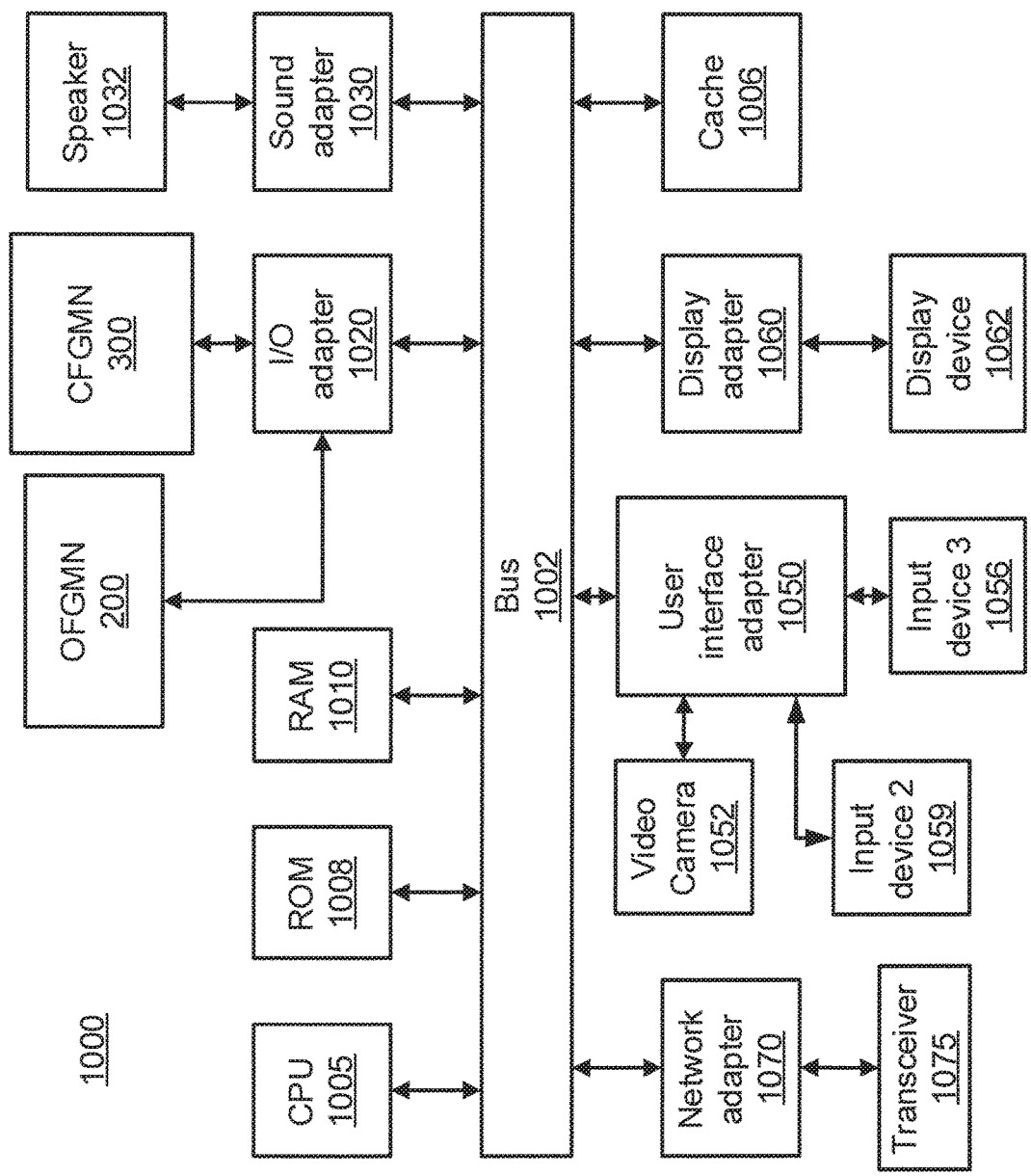
FIG. 6 is a block diagram of a computer processing system, to be used for activity recognition, in accordance with an embodiment of the present invention.

Referring now to FIG. 6, a block diagram of a computer processing system 1000, for activity recognition in video, is illustratively depicted in accordance with an embodiment of the present principles. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1070, a user interface adapter 1050, and a display adapter 1060, are operatively coupled to the system bus 1002.

A OFGMN 200 and a CFGMN 300 can be operatively coupled to system bus 1002 by the I/O adapter 1020. The networks 200 and 300 can be employed to detect objects within videos.

A speaker 1032 may be operatively coupled to system bus 1002 by the sound adapter 1030. The speaker 1032 can sound an alarm when controlled. A transceiver 1075 is operatively coupled to system bus 1002 by network adapter 1070. A display device 1062 is operatively coupled to system bus 1002 by display adapter 1060.

A video camera 1052, a second user input device 1059, and a third user input device 1056 are operatively coupled to system bus 1002 by user interface adapter 1050. The video camera 1052 can be utilized to capture video. The captured video can be fed into the OFGMN 200 and/or the CFGMN 300 for the object detection. The user input devices 1059 and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in the present invention. The user input devices 1059 and 1056 can be the same type of user input device or different types of user input devices. The user input devices 1059 and 1056 are used to input and output information to and from system 1000.

Of course, the computer system 1000 may also include other elements (not shown), as readily contemplated by one of skill in the art, as well as omit certain elements. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

Moreover, the computer processing system 1000 can be configured to initiate an action (e.g., a control action) on a controlled system, machine, and/or device responsive to a detected object in a video from the video camera 1052. Such action can include, but is not limited to, one or more of: powering down the controlled system, machine, and/or device or a portion thereof; powering down, e.g., a system, machine, and/or a device that is affected by the object, stopping a centrifuge being operated by a user before an imbalance in the centrifuge causes a critical failure and harm to the user, securing an automatic door, labeling the video with the recognized object and storing the video in a location for the object, and so forth. As is evident to one of ordinary skill in the art, the action taken is dependent upon the type of controlled system, machine, and/or device to which the action is applied.

Further, it is to be appreciated that computer processing system 1000 may perform at least part of the method described herein including, for example, at least part of method 700 of FIG. 7 and at least part of method 800 of FIG. 8.

Referring now to FIG. 7, a block diagram illustrating a method 700 for object detection utilizing an online flow guided memory network in accordance with an embodiment of the present invention. In block 710, receive a plurality of videos, each of the plurality of videos including a plurality of frames. In block 720, generate, with a feature extraction network, a frame feature map for a current frame of the plurality of frames. In block 730, determine a memory feature map from the frame feature map and a previous memory feature map from a previous frame by warping the previous memory feature map. In block 735, generate displacement vectors from the current frame and the previous frame. In block 737, aggregate the frame feature map with a warped memory feature map. In block 740, predict, with a task network, an object from the memory feature map. In block 750, control an operation of a processor-based machine to react in accordance with the object.

Referring now to FIG. 8, a block diagram illustrating a method 800 for object detection utilizing a clockwork flow guided memory network in accordance with an embodiment of the present invention. In block 810, receive a plurality of videos, each of the plurality of videos including a plurality of frames. In block 820, generate, with a feature extraction network, a frame feature map for a current frame of the plurality of frames. In block 830, aggregate a memory feature map from the frame feature map and previous memory feature maps from previous frames on a plurality of time axes, with the plurality of time axes including a first time axis at a first frame increment and a second time axis at a second frame increment with the second frame increment greater than the first frame increment, e.g., the first frame increment is every frame and the second frame increment is every other frame or every third frame. In block 840, predict, with a task network, an object from the memory feature map. In block 850, control an operation of a processor-based machine to react in accordance with the object.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for object detection utilizing an online flow guided memory network (OFGMN), the method comprising:

receiving, by a processor, a plurality of videos, each of the plurality of videos including a plurality of frames;

generating, by the processor with a feature extraction network, a frame feature map for a current frame of the plurality of frames;

determining, by the processor, a memory feature map from the frame feature map and a previous memory feature map from a previous frame by warping the previous memory feature map, the warping being updated at each of the plurality of frames and being configured to perform only a single warp computation per-frame, the memory feature map being generated by aggregating the frame feature map with the warped previous memory feature map;

spatially aligning hidden memory in the memory feature map with an observer and scene motion in particular content of the plurality of frames of the plurality of videos by ($h_t$=RNN (warp($h_{t-1}$, $D_{t,t-1}$), $x_t$)), where $h_t$ represents the frame feature map for a current frame, RNN represents a Recurrent Neural Network, $h_{t-1}$ represents a previous frame from the current frame, $D_{t,t-1}$ represents a displacement for each pixel between frames t and t−1, and $x_t$ represents a spatial alignment at the current frame;

predicting, by the processor with a task network, an object from the memory feature map; and controlling an operation of a processor-based machine to react in accordance with the object.

2. The computer-implemented method as recited in claim 1, wherein the generating includes employing a residual neural network.

3. The computer-implemented method as recited in claim 1, wherein the determining includes utilizing a displacement network.

4. The computer-implemented method as recited in claim 3, wherein the displacement network includes an optical flow convolutional neural network.

5. The computer-implemented method as recited in claim 3, wherein the displacement network generates displacement vectors from the current frame and the previous frame.

6. The computer-implemented method as recited in claim 1, wherein the aggregating includes employing simple averaging.

7. The computer-implemented method as recited in claim 1, wherein the aggregating includes utilizing a learned adaptive weighting.

8. The computer-implemented method as recited in claim 1, wherein the warping includes warping the previous memory feature map with displacement vectors from a displacement network to form a warped memory feature map.

9. The computer-implemented method as recited in claim 1, wherein the warping includes employing bilinear sampling.

10. The computer-implemented method as recited in claim 1, wherein the predicting includes utilizing a task convolutional neural network.

11. A computer program product for object detection utilizing an online flow guided memory network (OFGMN), the computer program product comprising a non-transitory computer readable storage medium having program instructions embodied therewith, the program instructions executable by a computer to cause the computer to perform a method comprising:

receiving, by a processor, a plurality of videos, each of the plurality of videos including a plurality of frames;

generating, by the processor with a feature extraction network, a frame feature map for a current frame of the plurality of frames;

determining, by the processor, a memory feature map from the frame feature map and a previous memory feature map from a previous frame by warping the previous memory feature map, the warping being updated at each of the plurality of frames and being configured to perform only a single warp computation per-frame, the memory feature map being generated by aggregating the frame feature map with the warped previous memory feature map;

spatially aligning hidden memory in the memory feature map with an observer and scene motion in particular content of the plurality of frames of the plurality of videos by ($h_t$=RNN (warp($h_{t-1}$, $D_{t,t-1}$), $x_t$)), where $h_t$ represents the frame feature map for a current frame, RNN represents a Recurrent Neural Network, $h_{t-1}$ represents a previous frame from the current frame, $D_{t,t-1}$ represents a displacement for each pixel between frames t and t−1, and $x_t$ represents a spatial alignment at the current frame;

predicting, by the processor with a task network, an object from the memory feature map; and controlling an operation of a processor-based machine to react in accordance with the object.

12. An object detector to detect objects in video, the object detector comprising:

a processing system including a processor device and memory coupled to the processor device, the processing system having program code configured to:

receive a plurality of videos, each of the plurality of videos including a plurality of frames;

generate, with a feature extraction network, a frame feature map for a current frame of the plurality of frames;

determine a memory feature map from the frame feature map and a previous memory feature map from a previous frame by warping the previous memory feature map, the warping being updated at each of the plurality of frames and being configured to perform only a single warp computation per-frame, the memory feature map being generated by aggregating the frame feature map with the warped previous memory feature map;

spatially align hidden memory in the memory feature map with an observer and scene motion in particular content of the plurality of frames of the plurality of videos by ($h_t$=RNN (warp($h_{t-1}$, $D_{t,t-1}$), $x_t$)), where $h_t$ represents the frame feature map for a current frame, RNN represents a Recurrent Neural Network, $h_{t-1}$ represents a previous frame from the current frame, $D_{t,t-1}$ represents a displacement for each pixel between frames t and t−1, and $x_t$ represents a spatial alignment at the current frame;

predict, with a task network, an object from the memory feature map; and control an operation of a processor-based machine to react in accordance with the object.

13. The object detector as recited in claim 12, wherein the feature extraction network includes a residual neural network.

14. The object detector as recited in claim 12, further comprising a displacement network that includes an optical flow convolutional neural network.

15. The object detector as recited in claim 14, wherein the displacement network generates displacement vectors from the current frame and the previous frame.

16. The object detector as recited in claim 12, wherein the warped memory feature map is formed by warping a previous memory feature map with displacement vectors from a displacement network.

17. The object detector as recited in claim 16, wherein the warped memory feature map is formed with bilinear sampling.

18. The object detector as recited in claim 12, wherein the aggregation system utilizes either simple averaging or a learned adaptive weighting.

\* \* \* \* \*